United States Patent [19]

Kono

[11] 4,214,833
[45] Jul. 29, 1980

[54] OPERATION TIMING CONTROL SYSTEM FOR MECHANICAL APPARATUS OPERABLE UNDER PROGRAM CONTROL

[75] Inventor: Tateomi Kono, Toyokawa, Japan

[73] Assignee: Minolta Camera Kabushiki Kaisha, Osaka, Japan

[21] Appl. No.: 23,091

[22] Filed: Mar. 22, 1979

[30] Foreign Application Priority Data

Apr. 10, 1978 [JP] Japan ............................... 53-42314

[51] Int. Cl.² ............................................. G03G 15/00
[52] U.S. Cl. .............................. 355/14 C; 355/3 TR; 355/14 TR
[58] Field of Search ........... 355/14 C, 14 TR, 14 SH, 355/3 R, 3 TR, 3 SH; 271/265, 258, 259

[56] References Cited

U.S. PATENT DOCUMENTS

| | | | |
|---|---|---|---|
| 3,930,725 | 1/1976 | Jones et al. | 355/14 SH |
| 4,025,187 | 5/1977 | Taylor et al. | 355/14 SH |
| 4,107,779 | 8/1978 | Fisk et al. | 355/14 C |

Primary Examiner—R. L. Moses
Attorney, Agent, or Firm—Wenderoth, Lind & Ponack

[57] ABSTRACT

A mechanical apparatus having a plurality of mechanisms each independently operable and a system for controlling the mechanisms by a program. For at least one of the mechanisms, the controlling system is caused by the program to produce an operation start signal with a timing earlier than the proper operation timing. The signal is fed to a time-adjustable delay mechanism, which in turn initiates the operation of the mechanism.

5 Claims, 11 Drawing Figures

OPERATION TIMING CONTROL SYSTEM FOR MECHANICAL APPARATUS OPERABLE UNDER PROGRAM CONTROL

BACKGROUND OF THE INVENTION

The present invention relates to a system for controlling operation timing for use in a mechanical apparatus which is operable under program control, such as by a microcomputer, and more particularly to an operation timing controlling system for the registration mechanisms of electrophotographic copying machines.

The construction and operation of a typical electrophotographic copying machine M operable under program control will be described briefly in connection with FIG. 1.

The copying machine M has two paper cassettes 1 and 2 for supplying either of two sizes of copy paper, and includes a photoconductive drum 3 which is rotatable in the direction of the arrow in the drawing. Upon rotation of the drum 3, the drum surface is subjected to the successive steps of uniform charging by a charger 4, exposure to the image of an original projected thereon at an exposure station Ex by an optical system to be described later, development of the latent image by a developing unit 5, transfer of the toner image by a transfer charger 6 onto copy paper fed in timed relation to the rotation of the drum, removal of charge by an a-c charger 7, and separation of the paper by a pawl 8. The paper separated from the drum is sent by a conveyor belt 9 to a fixing unit having heat rollers 10 by which the toner image is fixed with heat and/or pressure, whereupon the copy is discharged onto a tray 11. The toner remaining on the surface of the photoconductive drum 3 after the separation step is removed by a cleaning unit 12. An eraser 13 removes the residual charge from the drum surface, preparing the drum for a subsequent copying cycle. The optical system comprises an exposure lamp 14, first to fourth reflecting mirrors 15 to 18, and a lens 19. The exposure lamp 14 and the first reflecting mirror 15 are movable together leftward in FIG. 1 at a speed V/M in which V is the speed of travel for making equal size copies, and M is the copying magnification. The second reflecting mirror 16 is similarly movable leftward at one-half the speed of travel of the lamp 14. The reflectors 17 and 18 are stationary.

With copying machines in which two paper cassettes are mounted one above the other as described above, the length of the path extending from one cassette to the transfer station is different from that extending from the other cassette to the transfer station, as shown in FIG. 1. In order to properly position the leading end of the copy paper relative to the toner image on the drum in such a copying machine, the means for transport of the copy paper must be so set as to selectively operate one or the other of feed rollers 20 and 21 depending on which of the cassettes is to supply the paper and also to effect accurate registration by causing the copy paper to be temporarily halted for a period of time suitable to the particular type of paper selected. Many apparatuses have heretofore been proposed or provided for this purpose.

On the other hand, it has been the recent practice to control the operation of such a copying machine M by a digital control system, such as a microcomputer, capable of working out a program and which is incorporated in the machine M.

For such programmed control, the microcomputer functions as a timer for setting predetermined timing intervals based on the data stored in the microcomputer to give signals for controlling the operations of various components of the copying machine. The microcomputer times the sequence of operations on receiving a copying cycle initiating signal.

When a microcomputer is used for controlling the operation of the copying machine, this assures extremely accurate timing control and is also advantageous in that it can be used for setting a wide range of complex timings without making the construction of the copying machine itself complex.

However, because the microcomputer provides control signals in accordance with the data stored therein as described above and, accordingly, because all the copying machines of the same type to be controlled therewith will be controlled by the same timing signals for a given operation, it has been found that this mode of control, if used to achieve the aforementioned registration, gives rise to the following drawback.

In the copying machine, the registration mechanism functions to temporarily stop the paper in the course of the transport thereof and thereafter allows the paper to resume its forward travel in timed relation to the toner image on the surface of the photoconductive drum. To accomplish this, a timing roller 24 is provided which operates in the following manner. The copy paper forwarded, for example by the feed roller 20, comes into contact with the timing roller 24 in its stopped position, whereupon the roller 24 halts the leading end of the paper (see FIG. 1). An unillustrated clutch for driving the roller 24 is thereafter engaged in response to a predetermined timing signal to cause the paper to resume its travel again.

In this arrangement, the timing roller 24 actually starts to move some time after the clutch has received the signal which engages the clutch. This delay time varies from clutch to clutch. Consequently even if the timing signal given by the microcomputer is accurate, the position of the toner image transferred onto the paper differs slightly from machine to machine, causing problems in the actual use of the machine.

However, since the microcomputer produces timing signals in accordance with a predetermined program which cannot be altered easily, it is impossible to check each machine and remedy the possible error in the clutch operation by adjusting the timing with which the timing signal is emitted. This is one of the drawbacks of the microcomputer.

Although the errors involved in such a mechanical operation can not be corrected by adjusting the microcomputer, in order to provide a high quality copying machine, the erroneous operation of the registration mechanism of the copying machine, which appears directly in the copied image, must nevertheless be remedied.

SUMMARY OF THE INVENTION

The main object of this invention is to provide a system for controlling the actual operation timing of a mechanical apparatus which is operable under the control of a digital control system, such as a microcomputer, for effecting control according to a program.

Another object of the invention is to provide a timing control system for the registration mechanism of an electrophotographic copying machine for controlling the timing with which the copy paper, temporarily stopped during transport, is again caused to travel.

Another object of the invention is to provide a timing control system in which a microcomputer produces an operation control timing signal earlier than the actual operation timing contemplated so that an adjustable delay mechanism which starts to operate in response to the signal effects the actual operation.

Other objects and advantages of the invention will hereinafter become more fully apparent from the following description, taken together with the annexed drawings which illustrate preferred embodiments.

DESCRIPTION OF THE PREFERRED EMBODIMENTS

Figure 1:
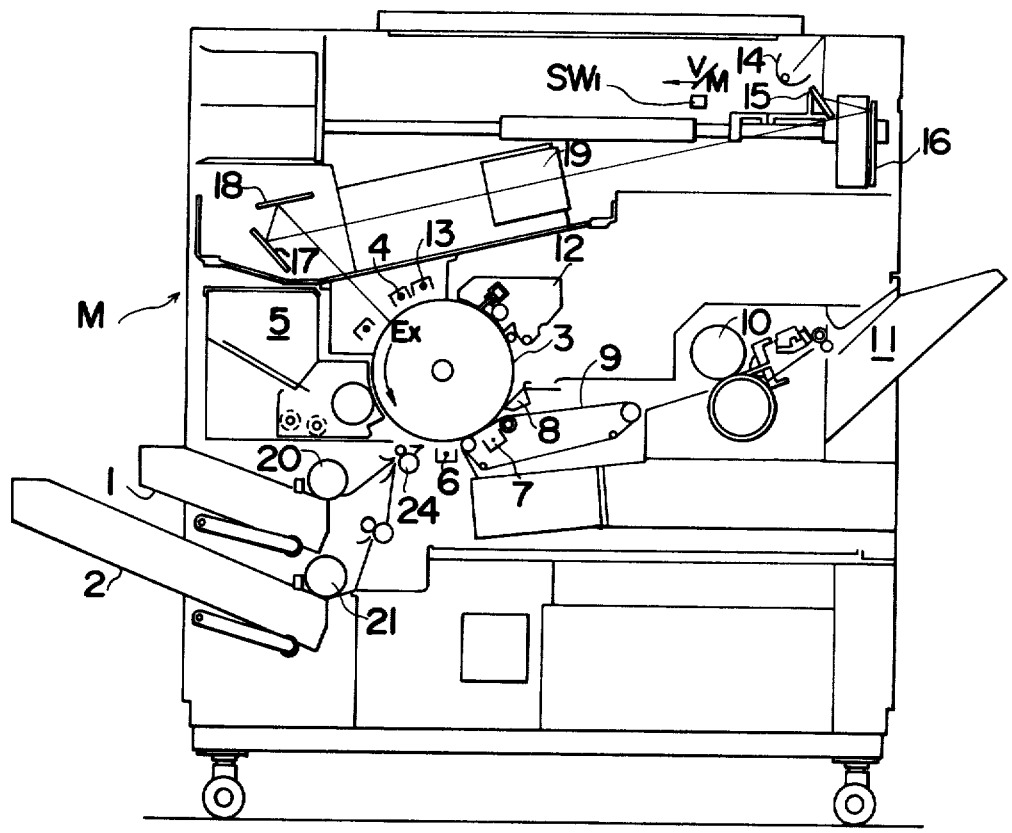
FIG. 1 is a sectional view of the mechanical apparatus of an electrophotographic copying machine.
Figure 2:
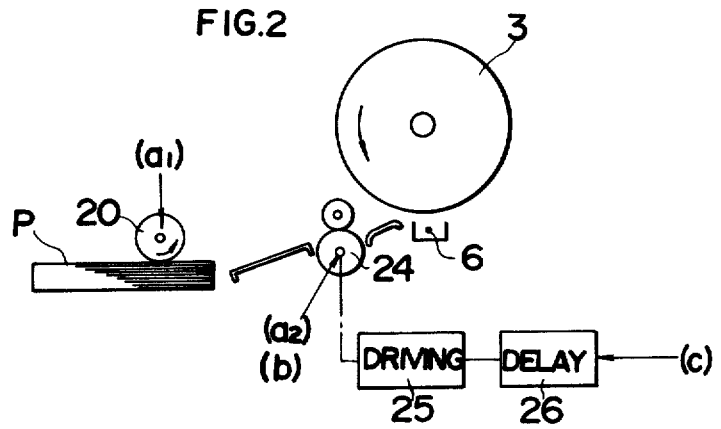
FIG. 2 is a diagram schematically showing a timing control system according to this invention to illustrate its construction and operation.

Embodiments of the invention will be described below with reference to the various Figures. Although the embodiments are especially useful with copying machines such as the copying machine M shown in FIG. 1, they are also useful with other types of machines. FIG. 2 shows an arrangement simplified for illustrative purposes. More specifically FIG. 2 shows a transport assembly including a registration mechanism and adapted to transport copy paper to a transfer station. The operation of the assembly of FIG. 2 by the control system of the present invention will be described with reference to FIG. 3. When the copying machine is given a start signal ST for starting a copying operation, a microcomputer, such as shown in FIG. 4, produces initiation instructing signals a1 and a2, starting rotation of a feed roller 20 and a timing roller 24 to forward a sheet of copy paper. At the same time, a timer A in the microcomputer is starting for running for a predetermined interval of time. When the predetermined time has elapsed, the microcomputer emits a stop instructing signal b, which brings the timing roller 24 to a halt so as to retain the copy paper in a specified position in front of the transfer station. The microcomputer starts operating in this way under a previously prepared program. Further when the start signal ST is given to the copying machine, the lamp 14 of the optical system is turned on and, at the same time, the travel of the movable parts of the optical system is initiated, and the photoconductive drum 3 starts to rotate so that a latent image is formed thereon. The image on the drum surface approaches the transfer station. At the start of the travel of the optical system in its scanning movement, a switch SW1 is actuated to emit a signal, which in turn starts a timer B running for an interval of time. When the time interval has elapsed, the microcomputer emits a restart instructing signal c for the timing roller 24. According to the program of the present control system, the time interval for which the timer B is set is such that the signal c will be emitted earlier than the actual time of restart of the timing roller 24. The restart instructing signal c is fed to a delay mechanism which is connected in turn to a solenoid or like drive means 25 for actuating a clutch mechanism for the timing roller 24 so that the interval of time elapsed from the emission of the restart instructing signal c until the actual restart of the timing roller 24 can be adjusted by the delay mechanism. Thus when the operation instructing timing does not coincide with the actual operation due to an error in the operation of the apparatus, the feed of the paper can be timed for movement with the image by adjusting the time interval.

The construction of the delay mechanism as well as the microcomputer will be described below in greater detail for illustrative purposes. FIG. 4 shows the basic construction of the microcomputer used as a system for controlling the operation of the copying machine under a program. The microcomputer comprises a central processing unit (CPU) including an arithmetic and logic unit (ALU), an accumulator (ACC), a decoder (DEC), a stack pointer (SP), a program counter (PC) and a timer (T), and at least one LSI including a random access memory (RAM) consisting essentially of semiconductor memory cells, and a read-only memory (ROM) for storing the program. The computer receives signals from external devices via an input/output interface while in response to the timing signals from the internal timer (T) and the like, the computer emits control signals in accordance with the numerical data stored in the program in the read-only memory (ROM). Any other peripheral LSI, if desired for the central processing unit (CPU), can be used in addition to the above exemplary arrangement. Furthermore memories (RAM) and (ROM) specific to the apparatus to be controlled may be incorporated therein as a chip to provide a central processing unit (CPU). For the microcomputer to perform the sequential control of the copying machine, a system is useful in which a shift register, memory (RAM) or the like is adapted to count up the standard timer pulses which are produced by the timer (T) or the like based on the operating clock pulses emitted by the microcomputer per se so that an operation control signal can be emitted to a particular operating portion of the machine based on a comparison between the count and the numerical value stored at the pertinent address of the memory in which the program is stored. Other useful systems include one in which the pulse signals produced in timed relation to the operation of the copying machine are counted up in the same manner as the above-mentioned standard timer pulses for the production of an operating signal based on the count. Either of such methods can be used.

Figure 5:
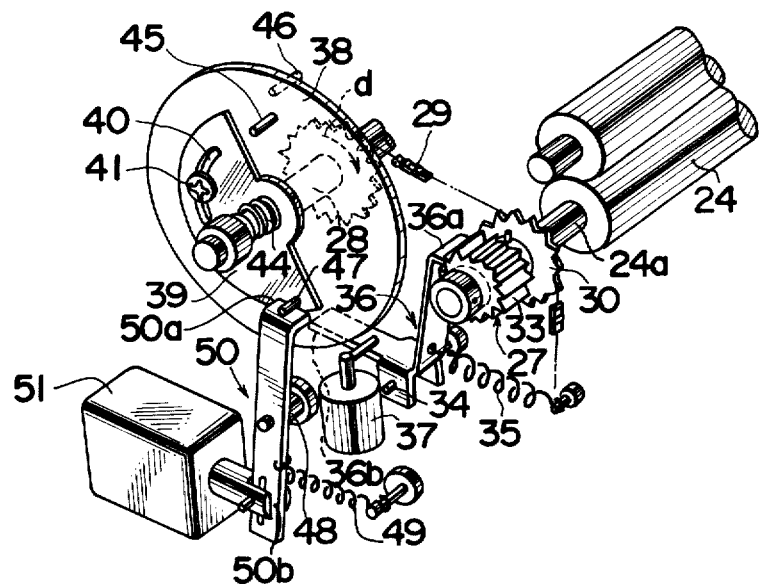
FIG. 5 is a perspective view of the delay mechanism and clutch mechanism of the timing control system of the present invention.
Figure 6:
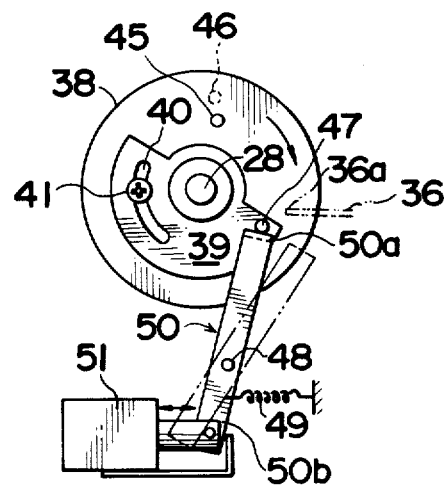
FIG. 6 is a fragmentary front view of the system of FIG. 5.
Figure 7:
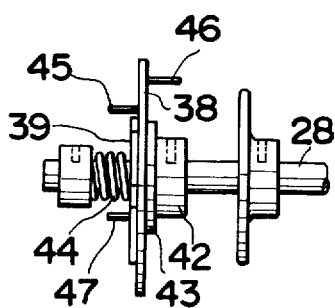
FIG. 7 is a fragmentary side elevation of the system of FIG. 5.

FIGS. 5 to 10 show the clutch mechanism and delay mechanism for the timing roller 24 constituting the registration mechanism for the copying machine. The torque of a drive shaft 28 in the direction of the arrow d is delivered to the timing roller 24 by way of a chain 29 and a spring clutch 27. As shown in greater detail in FIGS. 9 and 10, the clutch 27 comprises a sprocket wheel 30 freely rotatably mounted on the shaft 24a of the timing roller 24 and a collar 31 fixed to one end of the shaft 24a. The collar 31 has a boss portion 31a which is opposed to a boss portion 30a of the sprocket wheel 30. A coil spring 32 is normally loosely wound around both the boss portions 30a and 31a, but when the coil spring 32 is tightly wound up around the boss portions 30a and 31a, the collar 31 and sprocket wheel 30 are connected together. A ratchet wheel 33 freely fitted around the coil spring 32 has a small bore 33a in which the end of the coil spring 32 closer to the sprocket wheel 30 is engaged. A clutch blocking lever 36 pivotably supported by a pin 34 and urged by a spring 35 clockwise in FIG. 5 has a pawl 36a engaged with the ratchet wheel 33. A solenoid 37 is connected to the lever 36 for disengaging the lever from the ratchet wheel 33 in response to a control signal from the computer for permitting the first start of the timing roller 24. As shown in FIGS. 5 to 7, the drive shaft 28 is provided with a disk 38 and a semicircular plate 39 rotatably mounted on one end thereof. The semicircular plate 39 is fixedly mounted on the disk 38 by a screw 41 extending through an adjusting slit 40 in the plate so that the position of the plate 39 on the disk 38 can be changed. The disk 38 connected to the plate 39 is pressed by a spring 44 against a collar 42 secured to the drive shaft 28. A friction plate 43 is provided between the disk 38 and the collar 42. The disk 38 has a pin 45 fixedly mounted on the front side and a pin 46 on the rear side. The semicircular plate 39 carries a fixed pin 47 located on a circumference coinciding with the circumference on which the pin 45 on the disk 38 is positioned. The tail end 36b of the clutch blocking lever 36 is in the path of the pin 46 during rotation disk 38, while the upper end 50a of a stop 50 pivotably supported on a pin 48 is movable into and out of the path of the pins 45 and 47. The stop 50 is biased by a spring 49 in a counterclockwise direction in FIG. 6. A solenoid 51 is connected to the lower end 50b of the stop 50 for holding the stop 50 out of the above-mentioned path against the bias of the spring 49 for a specified period of time in response to a signal from the microcomputer for instructing the timing roller 24 to restart its rotation.

When a start signal ST is given to the copying machine, the computer feeds a start signal a2 to the solenoid 37 in accordance with the program stored in the read-only memory (ROM), whereupon the solenoid 37 functions to disengage the pawl 36a of the clutch blocking lever 36 from the ratchet wheel 33. Consequently the coil spring 32 of the clutch 27 is tightly wound up around the boss portions 31a and 30a to connect the collar 31 and sprocket wheel 30 together. The rotation of the drive shaft 28 delivered to the sprocket wheel 30 via the chain 29 is therefore further delivered to the shaft 24a of the timing roller 24. The timing roller 24 coacts with the feed roller 20 which is started by a control signal a1 from the computer simultaneously with the start of the roller 24, whereby a sheet of copy paper P in a cassette is sent forward. At this time, the timer A is started to run for a predetermined period of time preset on the program. When the predetermined time has elapsed, the microcomputer generates a signal b, deenergizing the solenoid 37, causing the spring 35 to engage the pawl 36a of the lever 36 with the ratchet wheel 33 again. The coil spring 32 acts in a direction to release the boss portions 31a and 30a therefrom, disconnecting the collar 31 and sprocket wheel 30 from each other and permitting the sprocket wheel 30 to rotate idly. As a result, the timing roller 24 comes to a halt and stops the copy paper. After the elapse of the time set on the aforementioned timer B, the computer feeds a timing roller restart signal c to the other solenoid 51, by which the upper end 50a of the stop 50, which has been blocking the semicircular plate 39 and disk 38 against rotation by contact with the pin 47 on the plate, is temporarily withdrawn from the path of the pin 47. Consequently the plate 39 and disk 38 start to rotate along with the drive shaft 28 under the action of the friction plate 43 and spring 44. Since the solenoid is immediately deenergized, the stop 50 is returned to its initial position by spring 49. Due to the continued rotation of the disk 38, the pin 45 on the disk 38 at the same radial distance from the shaft 28 as the pin 47 comes to a position where the pin 45 is blocked by the stop 50. In this position, the pin 46 on the rear side of the disk 38 is so situated as to depress the tail end 36b of the clutch blocking lever 36, with the result that the pawl 36a of the lever is disengaged from the ratchet wheel 33. The spring clutch 27 now functions in the same manner as already described, restarting the timing roller 24, which in turn feeds the copy paper to the transfer station. Subsequently when the time set on a timer C has elapsed, the computer feeds a control signal to the solenoid 51 to energize the solenoid again and release the pin from the stop 50. The pin 45 on the disk 38 passes by the stop 50 in its withdrawn position. The solenoid 51 is thereafter deenergized. The pin 47 on the semicircular plate 39 comes to the position where it is again blocked by the stop 50 against rotation, whereupon the plate 39 and disk 38 are stopped.

If the copy paper which is caused to start to travel again by the foregoing operation is not brought into accurate register with the toner image on the photoconductive drum, the improper timing can be easily remedied by loosening the screw 41 to release the semicircular plate 39 from the disk 38 and adjusting the angular position of the plate 39 about the shaft 28, thus adjusting the position of the pin 47 on the plate 39 relative to the pin 45 on the disk 38.

Figure 8:
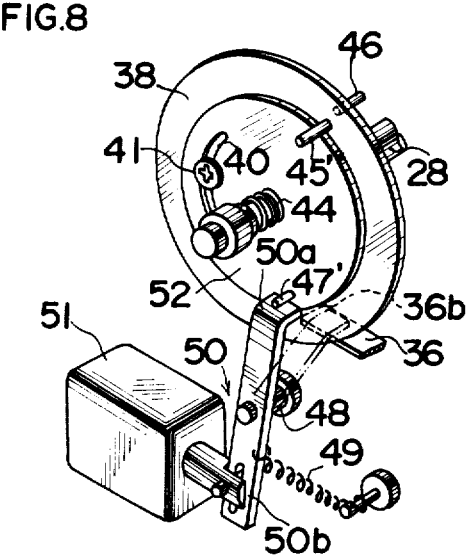
FIG. 8 is a perspective view of another embodiment of the delay mechanism.
Figure 9:
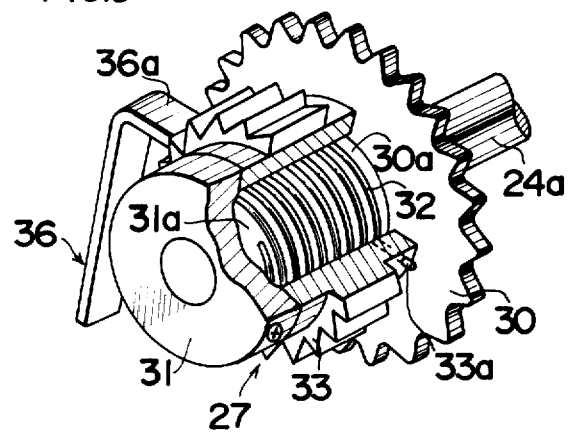
FIG. 9 is a perspective view, partly broken away, of the clutch mechanism.
Figure 10:
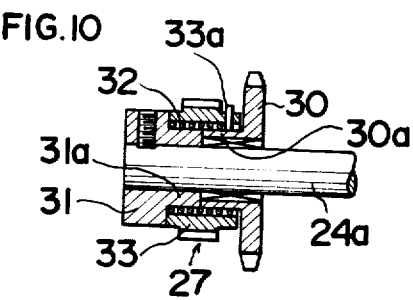
FIG. 10 is a fragmentary sectional view of the clutch mechanism of FIG. 9.

Alternatively the arrangement shown in FIG. 8 can be used for providing an adjustable time lag relative to the timing roller restart signal c. A small disk 52 which is adjustably fixed on the disk 38 is provided with a pin 47' on a circumference different from the circumference on which the pin 45' on the front side of the disk 38 is positioned. The solenoid 51 is adapted to be energized by the restart signal c from the computer to move the stop 50 out of the path of the pin 47' moving with the rotation of disk 38 as indicated by the broken line in FIG. 8. The stop 50 when it is in the dotted line position blocks the pin 45' on the front side of the disk 38 and at the same time the pin 46 depresses the tail end 36b of the lever 36 as already described. The timing roller 24 will then be rotated through the spring clutch until the solenoid 51 is deenergized.

Figure 3:
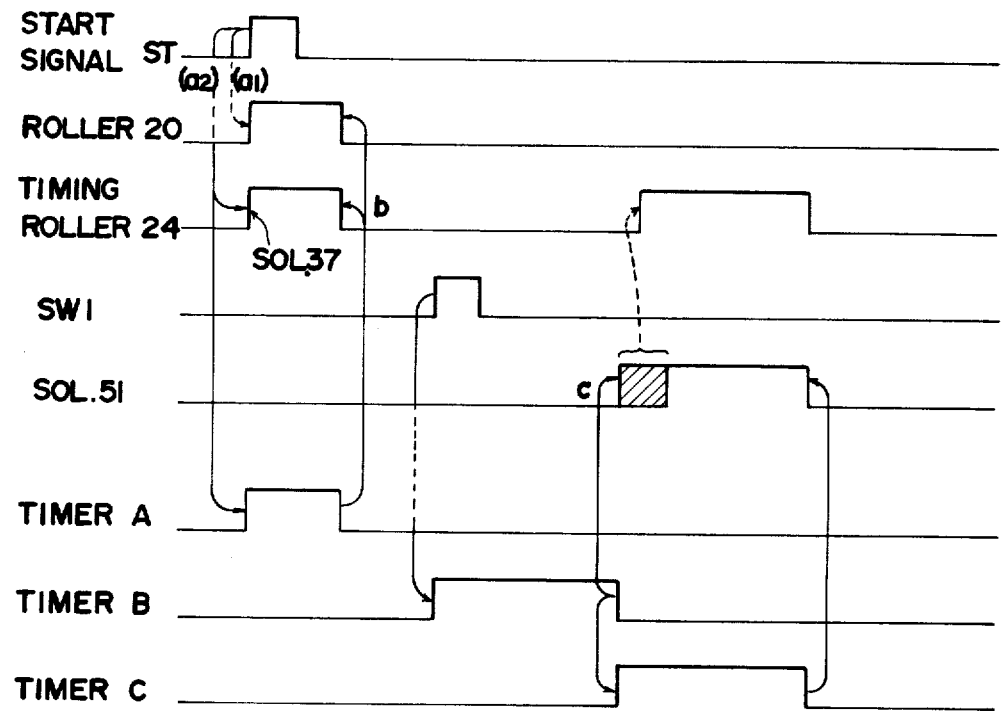
FIG. 3 is a time chart for illustrating the operation of the system of FIG. 2.
Figure 4:
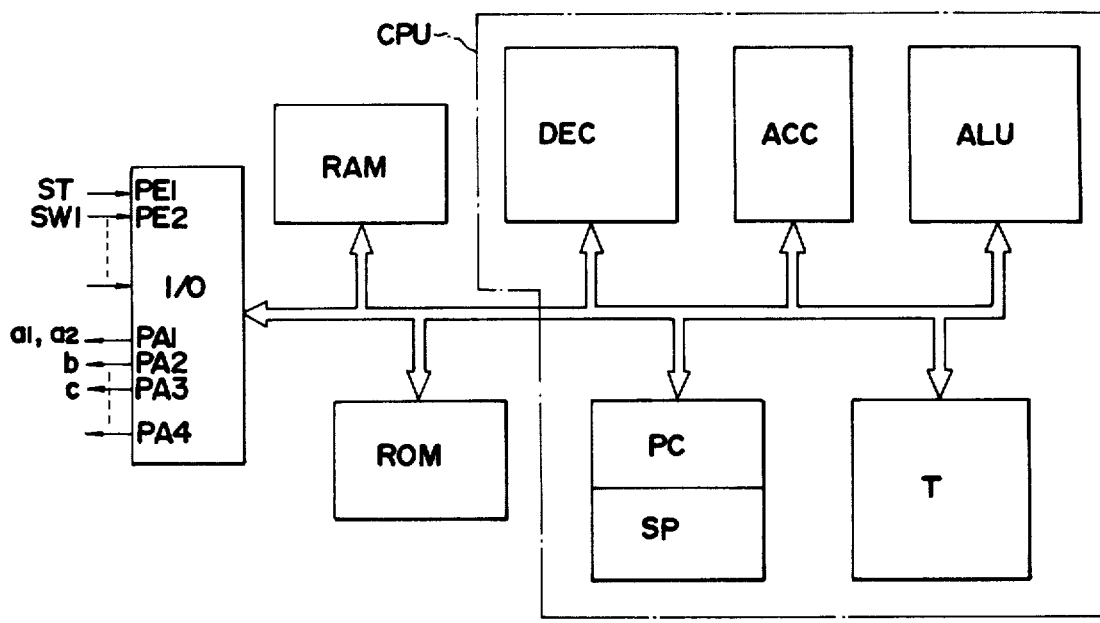
FIG. 4 is a schematic diagram showing the construction of a microcomputer.

The operation of the solenoid 51 shown in the time charge of FIG. 3 corresponds to that in the embodiment of FIG. 8. The means not shown in FIG. 8, such as the clutch mechanism for driving the timing roller 24, are the same as those shown in FIGS. 5, 9 and 10.

Figure 11:
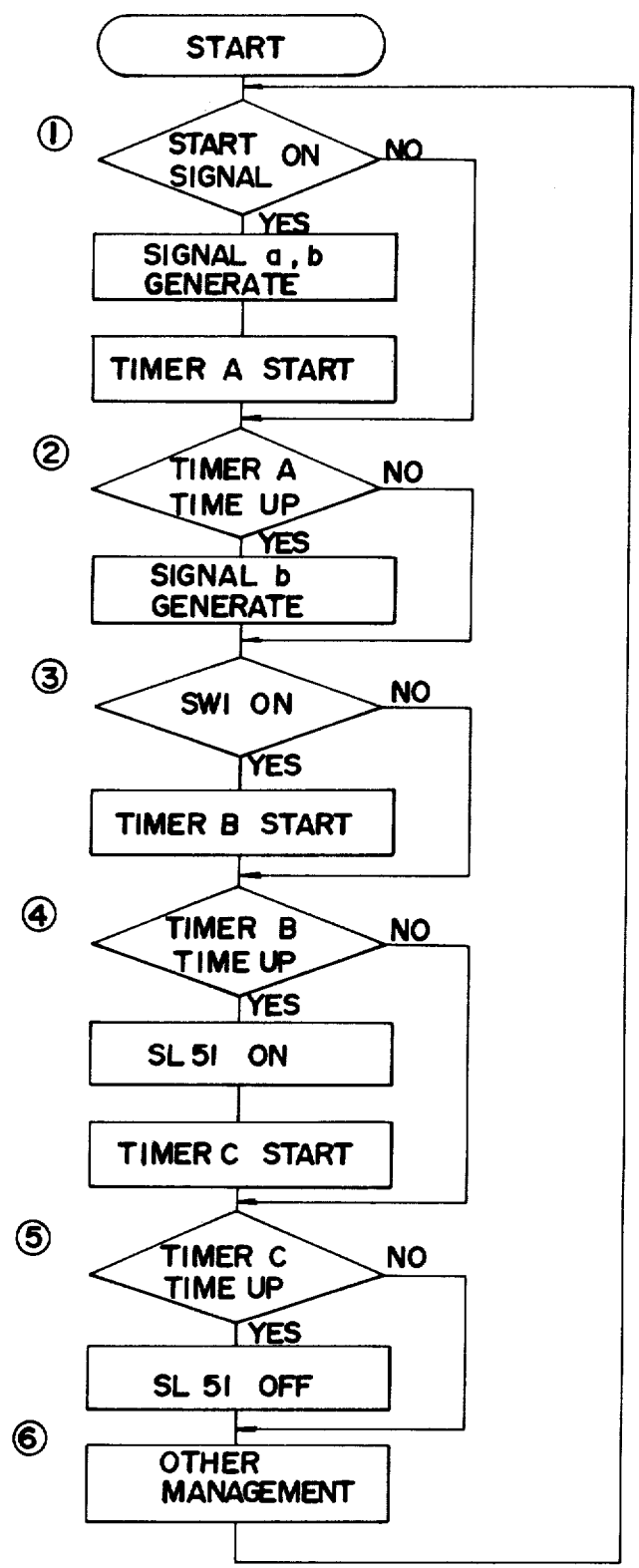
FIG. 11 is a flow chart for illustrating the control afforded by the microcomputer.

FIG. 11 is a flow chart illustrating the control operation performed within the microcomputer (having the construction shown in FIG. 4) and corresponding to the time chart of FIG. 3.

In Step 1, the computer determines whether or not a copying operation start signal ST has been produced, if YES, signals a1 and a2 are generated for starting the feed roller 20 and timing roller 24, and the timer A is set. The signals a1 and a2 are fed out from an output port PA1 of the interface I/O. When an unillustrated retrieval signal is produced from an output port PA4, the computer determines whether the start signal ST is "1" to "0" to check for the presence of the signal ST. If the start signal is "1", a signal is emitted from an input PE1 to a specified address of the random access memory (RAM) to check the state of the address for judgement.

The state of the timer A started in Step 1 is checked in Step 2. When the set time has elasped, the computer generates a stop signal b at an output port PA2 for the rollers 20 and 24.

The state of the timer A is judged substantially in the same manner as those of the timers B and C to be described below. For this procedure, the program for setting the timer A is stored in the read-only memory (ROM) at a specified address. The random access memory (RAM) reads out the numerical value stored in the program at this address, while a counter (RAM or register) counts up the timer pulses for every routine of the microcomputer, and the count is shifted to the accumulator (ACC). The data in RAM and the data in the ACC are compared for the judgement. One routine of the microcomputer takes about 1 to about 10 msec.

In Step 3, the operation of the switch SW1 actuated by the movement of the aforesaid optical system is checked. If the state of operation is found to be YES, the timer B is set. The determination of the state of operation of the switch SW1 is performed in the same manner as that for the start signal ST. The resulting signal is fed to an input port PE2.

In Step 4, the state of the timer B is checked. When the timer set thereon has elapsed, a timing roller restart signal c is emitted from an output PA3 to energize the solenoid 51 and set the timer C.

In Step 5, the state of the timer C is checked to deenergize the solenoid 51 after the elapse of the set time.

In the embodiment of FIGS. 5 to 7, the energizing signal for the solenoid in Step 4 is generated in the form to deenergize the solenoid 51 immediately after it has been energized. The signal output used in Step 5 is such that the solenoid is energized again after the elapse of the time set on the timer C and is deenergized immediately thereafter.

According to the embodiments described above, the timing roller 24 is first caused to start rotating in response to the signal a2 simultaneously with the feed roller 20 and is thereafter brought to a halt with the copy paper engaged therewith. However, the timing roller 24 need not always be rotated at first but the feed roller 20 alone may be driven, allowing the leading end of the paper to form a loop in contact with the timing roller 24 before coming to a stop.

Step 6 shown in FIG. 11 is an overall step including judging, processing and like steps other than those carried out for the operation control contemplated by the invention. Step 6 therefore covers the operation control of the copying machine M. Steps 1 to 6, providing one routine are repeatedly performed within the microcomputer.

While the desired time lag can be provided by the mechanical structure described above, the arrangement of FIG. 5 may be modified as described below. The solenoid 37 for directly operating the clutch actuating lever 36 to first start the timing roller 24 may be provided in parallel to the input channel for the initial start signal from the computer, with another channel being provided for feeding the restart signal so that the signal applied to the latter channel will be delayed by a delay circuit for a specified period of time before being fed to the solenoid 37, with the delay time being made variable as desired by a delay circuit delay varying means or the like.

With mechanical apparatus which is operable under the control of a computer, the programmed control timing provided by the computer will be out of concidence with the proper timing by different amounts from apparatus to apparatus, whereas this invention assures adjustment of the timing with ease without resorting to the extremely difficult procedure of modifying the program. The present invention is useful for example for copying machines which include a microcomputer as control means and in which the registration of the copy paper with the toner image on the photoconductive drum, even if it varies slightly, will provide an adverse effect directly on the copy obtained. While it is difficult to modify the control timing programmed for the computer in such a case, the invention makes it possible to provide the desired adjustment with ease for the production of the most suitable copies.

What is claimed is:

1. In a mechanical apparatus having a plurality of mechanisms each of which is independently operable, means for driving the respective mechanisms, and mechanism starting means for starting the operation of at least one of the mechanisms in the midst of an operation of the mechanical apparatus, a means for controlling the timing of operation of said one of said mechanisms, said controlling means comprising:

a program controlling device for said mechanical apparatus having a timer means set for a predetermined time which is set in the program of said program controlling device as a numerical data and which is such as to end at a time earlier than the time for the proper operation of said mechanism starting means;

apparatus starting means for starting the operation of the mechanical apparatus;

timer starting means connected between said apparatus starting means and said timer means for starting the operation of said timer means at the time of the start of operation of the mechanical apparatus;

starting signal generating means forming part of said program controlling device and operated by said timer for generating a starting signal for said one of the mechanisms when said predetermined time has elapsed; and delay means connected between said starting signal generating means and said mechanism starting means for receiving said starting signal for starting the operation of said mechanism starting means and supplying it to said mechanism starting means after a time delay, said delay means including an adjusting means for adjusting the delay time.

2. A copying apparatus having a movable photoconductive member, means for forming an image on a surface of the photoconductive member, means for transferring the image on the surface of the photoconductive member to a sheet of copying paper which is fed past said transferring member by a paper feeding means, means for temporarily stoping the copying paper at a position upstream of the transferring means, and restarting means for restarting the operation of feeding the copying paper from the stopped position thereof toward the transferring means, means for controlling the timing of the operation of at least the restarting means, said controlling means comprising:

a program controlling device for said copying apparatus having a timer means set for a predetermined time which is set in the program of said program controlling device as a numerical data and which is such as to end at a time earlier than the time for the proper operation of said restarting means;

copying apparatus starting means for starting the operation of the copying apparatus;

timer starting means connected between said copying apparatus starting means and said timer means for starting the operation of said timer means at the time of the start of operation of the copying apparatus;

restarting signal generating means forming part of said program controlling device and operated by said timer for generating a restarting signal for said restarting means when said predetermined time has elapsed; and delay means connected between said restarting signal generating means and said restarting means for receiving said restarting signal and supplying it to said restarting means after a time delay, said delay means including an adjusting means for adjusting the delay time.

3. Means for controlling the timing operation of the restarting means as claimed in claim 2 in which said restarting means is a clutch mechanism, and said delay means comprises a lever means engagable with said clutch mechanism for blocking operation thereof and means for engaging said lever and moving it out of engagement with said clutch mechanism after a time delay for permitting operation of said clutch to drive said paper feeding means.

4. Means as claimed in claim 3 in which said lever means is a pivotally mounted lever having one end engagable with said clutch means and a driven disk adjacent the other end of said lever having lever engaging means thereon and rotatable for moving said lever engaging means from a first position spaced from said lever to a second position engaging said lever to pivot said lever out of engagement with said clutch, and means responsive to receipt of said restarting signal for releasing said disk from a blocked condition for permitting it to be driven for moving said lever engaging means from said first position to said second position, said disk having means thereon for adjusting the length of time for moving said lever engaging means from said first position to said second position.

5. Means as claimed in claim 4 in which said disk has a first pin thereon adjacent said lever engaging means and a second pin thereon and spaced circumferentially of said disk from said first pin, and said disk releasing means comprises a lever engaged by said pins and having a solenoid connected thereto for pivoting said lever out of the path of said pins, said second pin being circumferentially adjustably mounted on said disk.

* * * * *